United States Patent
Lenz et al.

[11] Patent Number: 5,977,647
[45] Date of Patent: Nov. 2, 1999

[54] AUTOMATIC PRETRIP FOR ENGINE POWERED GENERATOR

[75] Inventors: Douglas E. Lenz, Savage; Ladislaus J. Brabec, St. Paul; Jay L. Hanson; Dave Forsmark, both of Bloomington; Mike P. Gaynor, Apple Valley; Doyle G. Herrig, Elko; Phil L. Lee, Edina, all of Minn.

[73] Assignee: Thermo King Corporation, Minneapolis, Minn.

[21] Appl. No.: 08/979,903

[22] Filed: Nov. 26, 1997

[51] Int. Cl.$^6$ .................................................... F02N 17/00
[52] U.S. Cl. ......................... 290/40 C; 290/51; 322/10; 123/179.4
[58] Field of Search ................... 290/40 R, 40 B, 290/40 C, 40 D, 51; 123/179.4; 62/126, 133; 322/10, 11, 12

[56] References Cited

U.S. PATENT DOCUMENTS

| | | |
|---|---|---|
| 3,518,445 | 6/1970 | Wichman .................................. 290/30 |
| 3,960,011 | 6/1976 | Renz et al. ................................ 73/116 |
| 4,192,279 | 3/1980 | Maisch et al. ........................ 123/198 F |
| 4,286,683 | 9/1981 | Zeigner et al. ....................... 180/54 R |
| 4,322,630 | 3/1982 | Mesera et al. ............................. 290/40 |
| 4,364,343 | 12/1982 | Malik ................................... 123/179 B |
| 4,379,990 | 4/1983 | Sievers et al. ............................ 322/99 |
| 4,448,021 | 5/1984 | Hawkins .................................... 60/449 |
| 4,463,305 | 7/1984 | Wineland et al. ......................... 322/10 |
| 4,629,968 | 12/1986 | Butts et al. ............................... 322/29 |
| 4,668,872 | 5/1987 | Lerouge et al. ...................... 292/40 R |
| 4,721,083 | 1/1988 | Hosaka .................................... 123/339 |
| 4,764,838 | 8/1988 | MacFarlane .............................. 361/21 |
| 4,853,553 | 8/1989 | Hosie ................................... 290/40 C |
| 5,072,703 | 12/1991 | Sutton .................................. 123/179.4 |
| 5,231,344 | 7/1993 | Marumoto et al. ....................... 322/14 |
| 5,303,560 | 4/1994 | Hanson et al. ............................ 62/126 |
| 5,390,068 | 2/1995 | Schultz et al. ............................ 361/95 |
| 5,454,229 | 10/1995 | Hanson et al. ............................ 62/126 |
| 5,561,330 | 10/1996 | Crook .................................... 290/30 R |
| 5,621,304 | 4/1997 | Kikuchi et al. ........................... 322/18 |

Primary Examiner—Nestor Ramirez
Assistant Examiner—Nicholas Ponomarenko
Attorney, Agent, or Firm—Michael M. Gnibus

[57] ABSTRACT

A method and apparatus for making a pretrip diagnosis and identification of generator set problems which could cause shutdown or undesired operation of the generator set.

15 Claims, 1 Drawing Sheet

AUTOMATIC PRETRIP FOR ENGINE POWERED GENERATOR

CROSS-REFERENCE TO RELATED APPLICATIONS

The present application is related to U.S. patent application Ser. No. 08/979,902, filed on date even herewith, entitled "METHOD AND APPARATUS FOR AUTOMATICALLY STOPPING AND RESTARTING AN ENGINE POWERED GENERATOR".

BACKGROUND OF THE INVENTION

The present invention pertains generally to the field of generator sets. In particular, the present invention pertains to engine controls for generator sets used to power heating and cooling devices for controlling the temperature of cargo containers.

Containerized shipment of goods has become a widely accepted means of transporting cargo around the world. Modern containers can be stacked on the decks of a ship for shipment overseas. When a container ship arrives at a port, the containers can be efficiently removed from the shipment by crane. At the port, the containers can be stacked for further ship by truck or rail. When the containers are shipped by truck, a single container is usually placed on a semi-trailer chassis. Each rail car generally can support up to four containers.

When the cargo includes perishables such as food stuffs or flowers, the temperature in each of the containers must be controlled to prevent loss of the cargo during shipment. For shipments of perishable goods, specialized containers have been developed which include temperature control units for refrigeration and/or heating. While on board ship, the containers can be connected to a ship's generator for power to the temperature control units. When the containers are in port, they may be connected to a power source provided by a local utility.

When, however, the containers are in transit by railcar or truck, generator sets must be provided to power the temperature control units. Such generator sets usually include a diesel engine to power a generator which in turn provides electric power to the temperature control units. Such generator sets can be clipped directly to a container or fastened to a trailer chassis.

During shipment, the temperature control units and generator sets must operate for extended periods of time. For example, when lettuce is shipped from California to the northeastern United States, the sets may run periodically for several days. During this extended period of time, the temperature control unit and generator set will operate for extended periods without inspection by transportation workers. This is particularly true in the case of rail transportation where scores of railcars may, for extended periods, be in transport while accompanied by only two or three workers.

During these extended periods when the temperature control units and generator sets are substantially unmonitored by transportation workers, the generator sets may experience "nuisance" shutdowns, causing a loss of power to the temperature control unit. This may result in a loss of the perishable cargo. This is particularly true if ambient temperature conditions are very hot or very cold. A nuisance shutdown is usually caused by a transitive condition which may exist briefly, but does not involve a chronic generator set problem which will persist when the transitive condition abates. Thus, the engine or generator set could be restarted if an operator notices that the shutdown had occurred.

In addition to nuisance shutdowns, the generator may shutdown for a non-transitive cause. For example, there may be a chronic generator set problem such as loss of engine coolant. In such a case, the generator could not be safely restarted without risking permanent damage to the engine.

As providing a consistent source of power to the container temperature control units is essential if the loss of perishable cargo is to be prevented, a number of methods and apparatus have been proposed for controlling generators. None of these, however, have addressed the serious problem of correcting generator set nuisance shutdowns during an extended period where the generator set is unattended. Further, they have inadequately dealt with non-transitive causes of engine shutdowns.

U.S. Pat. No. 5,390,068 to Schultz et al. discloses a microprocessor based generator set controller apparatus and method which monitors various engine and generator faults and uses the generated signals to control the operation and output of the engine generator system. Schultz et al. also discloses the controller includes self diagnostic and serial communications ports.

U.S. Pat. No. 5,561,330 to Crook discloses an automatic electric power generator control that automatically starts the generator engine and the generator when a demand is made for electric power. U.S. Pat. No. 4,853,553 to Hosie discloses a control system for controlling electric generating apparatus including electrically heated combustion engines. Finally, U.S. Pat. No. 4,463,305 to Wineland et al. discloses a method and system for delaying mechanical loading of an internal combustion engine by an alternator during startup of the engine by inhibiting the field winding current of the alternator until the engine reaches a predetermined operational condition.

Thus, what has not heretofore been provided is a method and apparatus for restarting an unattended, nuisance shutdown generator set. Further, prior methods and apparatus have inadequately served to prevent engine shutdowns for non-transitive causes. Such an apparatus would provide substantial advantages in the field of container shipment and particularly in the container shipment of perishable items.

SUMMARY OF THE INVENTION

The present invention pertains to a method and apparatus for aiding in the diagnosis of non-transitive generator set engine problems which can cause generator shutdowns. The present invention also relates to a method and apparatus for restarting a generator set following a "nuisance" shutdown. A nuisance shutdown may occur when the generator set experiences a transitory, environmental or operational change. Such a transitory change could occur as a generator set operating on a railcar passes through a low oxygen environment such as a tunnel. In such a low oxygen environment, a generator set powered by a diesel engine may shutdown as the diesel engine receives insufficient oxygen for diesel fuel combustion.

Whatever the cause of the nuisance shutdown, however, the assumption is that the condition causing the nuisance shutdown is transitive, thus adversely effecting the generator set for a limited period of time. Consequently, the generator set should be operable after the transitive condition has passed. Once the transitive condition has passed, the engine of the generator set should be capable of restarting without causing permanent damage to the generator set. Non-transitive causes of engine shutdowns, in contrast to those which cause nuisance shutdowns are those which would generally require engine repair or maintenance.

ENGINE RESTART

The method in accordance with the present invention includes the step of sensing whether a generator set engine has shut down during normal operation. If the engine has shut down, after a pause for a period of time, the engine is restarted.

The method can also include the steps of sensing certain engine operating parameters, while the engine is running. If the parameter is not in an appropriate operating range, the engine is shut down. The parameter is then sensed again, after a delay of several minutes, to determine if the parameter has returned to within the operating range. If the parameter has returned to within the operating range, the engine will continue to run as required to meet power demands.

In accordance with the present invention, one or more parameters could be sensed. These parameters may include, among others, engine coolant temperature, engine speed, oil pressure, battery voltage and fuel pressure.

An apparatus can be provided to perform the method. Such an apparatus includes at least one engine operating parameter sensor. The apparatus also includes a controller including means for determining whether the parameter sensed by the sensor is within an operating range. The controller includes means for shutting down the engine if the parameter is outside the operating range. The controller also includes means for restarting the engine after a period of time following a shutdown of the engine. The means for determining can also include means for redetermining the status of the parameter following restarting of the engine.

The apparatus can also include means for recording the time of an engine shutdown. The apparatus can also include additional sensors for sensing additional engine operating parameters. These sensors can sense those parameters discussed above with respect to the method. The apparatus can also record which parameters were operating outside of the operating range when the engine was shutdown.

The foregoing and other aspects will become apparent from the following detailed description of the invention when considered in conjunction with the accompanying drawing FIGURE.

BRIEF DESCRIPTION OF THE DRAWING FIGURE

The FIGURE is a block diagram of a generator set including a controller in accordance with the present invention.

DETAILED DESCRIPTION OF THE INVENTION

Figure 1:
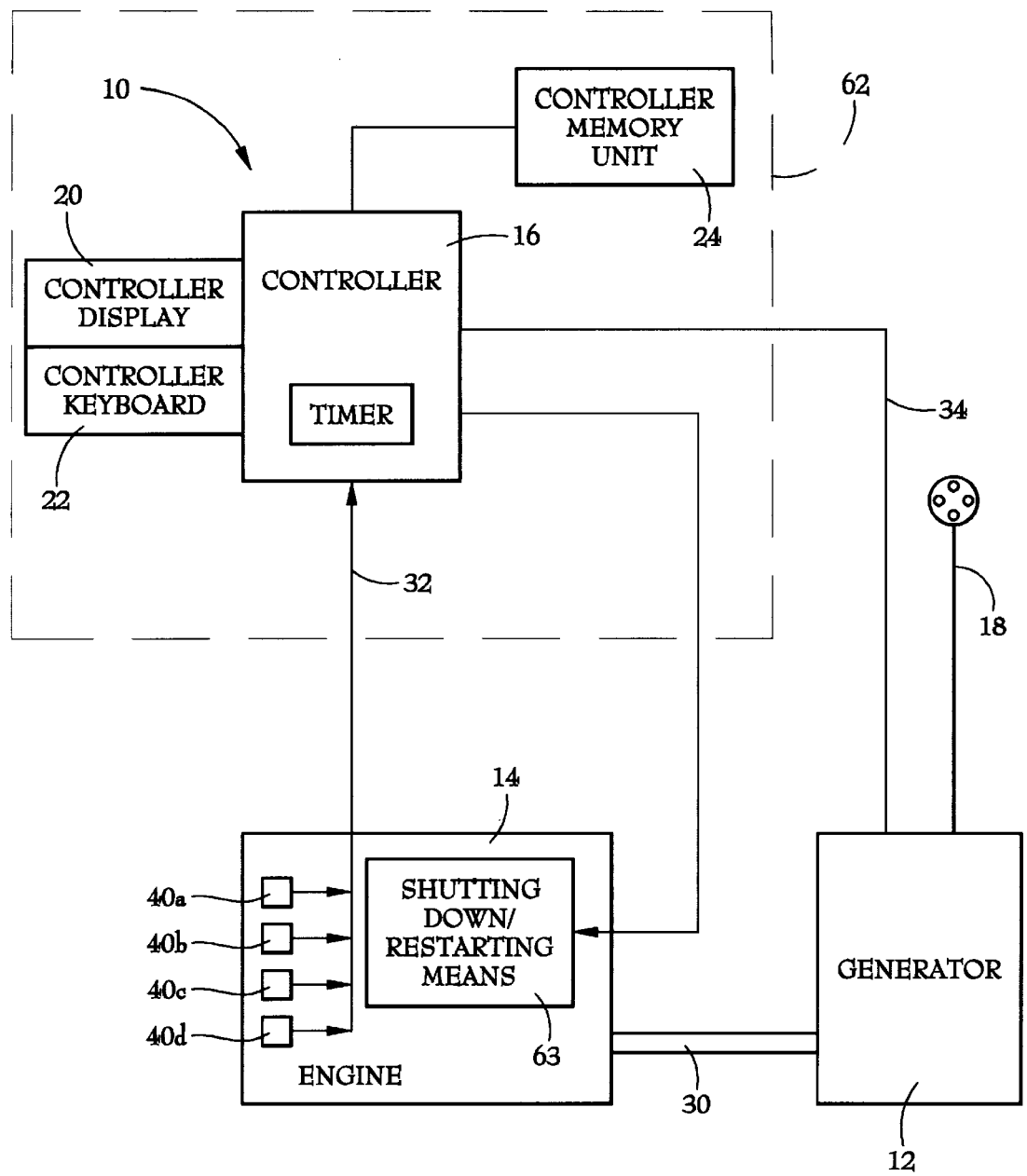

Referring now to the FIGURE, a generator set 10 in accordance with the present invention is shown in block drawing form. Generator set 10 includes three principal components, a generator 12, engine 14 and a controller 16. The controller is enclosed by controller enclosure with enclosure walls 62 represented in dashed font in the FIGURE.

Engine 14 is preferably an industrial duty diesel engine such as an exclusive se 2.2 liter direct injection industrial duty diesel engine. Such an engine, as one skilled in the art would recognize, would include a cooling system, such as a water or liquid coolant system; an oil lubricant system; an electrical system including a battery, alternator and glow plug; and a fuel system including a fuel tank and fuel solenoid for controlling the flow of fuel to the cylinders. An air filter (not shown) filters air channeled to the cylinders for combustion. The engine also include means for restarting the engine 63 which may be any well known starter or the like. Means 63 is in signal receiving relation with controller 16. A drive shaft 30 transfers energy from the engine to the generator.

Generator 12 could be, for example, a 15 KW, 18.75 KVA, 230, 460 VAC, 3-phase, 60 Hz direct drive, brushless generator. Those skilled in the art would recognize that other generators could be advantageously used and that the specifically recited generator is exemplary only. The above-described generator, as indicated, can be wired for 230 V and 460 V ac power output, or some other output. Power cable 18 can be used to deliver power to a temperature control unit for a cargo container or other application.

Controller 16 includes the standard controls for operating a generator set as known to those skilled in the art. Controller 16, however, in accordance with the present invention includes additional controls to perform the method of the present invention. The controller is connected to the engine 14 and generator 12 to perform routine functions such as operator-initiated engine startups and shutdowns. The engine 14 and generator 12 are electrically connected to controller 16 by connection cables means 32 and 34 respectively. The controller is also connected to various engine component sensors. For example, the controller can be connected to a water temperature sensor, engine rpm sensor, oil pressure sensor, and air flow sensor. Such sensors are represented generally as 40a, 40b, 40c, and 40d in the FIGURE and are shown in signal transmitting relation with the controller 16.

Controller 16 includes processor logic which can be executed by a microprocessor to make various engine operating decisions in response to determining certain engine operating parameters based upon control sensor readings. These control processes are discussed in more detail below.

Controller 16 preferably includes an operator interface including a display 20 which could be, for example, an LCD display. Controller 16 also includes a keyboard or pad 22 for entering commands. Controller 16 includes a memory unit 24, such as a Random Access Memory ("RAM") which can maintain a log of certain engine operating parameters, their values and the times at which those values occurred particularly at the time of an engine shutdown. Memory unit 24 can be used to store other data as well.

The arrangement of generator set components described above can advantageously be used to execute the method of the present invention by one skilled in the art. If a nuisance generator set shutdown occurs, the controller will initiate an automatic restart. The engine will not automatically restart if the processor determines that based upon sensor readings, certain engine operating parameters are outside of appropriate ranges. If restart does not occur, the controller can wait for a time interval, for example, a twenty minute interval and try restarting the engine again. If, because the operating parameter or parameters continued to be outside of the appropriate range(s), the controller can wait for another time interval, such as a twenty minute interval, and attempt another restart of the engine until the engine is successfully restarted or the battery charge is exhausted. Although a twenty minute wait between restarts is preferred to allow a transitive nuisance shutdown cause to abate, a wait of just about one minute could be used. A longer wait of an hour or more could be used, but longer waits may be undesirable as temperature control will be lost for an extended period of time.

Engine shutdowns can be controller initiated if an engine operating parameter being monitored by the controller is determined by the controller to be outside of normal operating ranges. Engine shutdowns can also occur for extraneous reasons and transitive ambient conditions not initiated by the controller, for example, if the engine is starved for oxygen.

Engine operating parameters which can trigger a shutdown include engine water temperature, rpm's, oil pressure, battery voltage, and air flow rate. It can be appreciated by one skilled in the art that various other engine parameters may advantageously be monitored and that this list is illustrative only.

The engine water temperature parameter can be used in the engine shutdown and restart routine in the illustrative manner that follows. For example, if the engine is running, water temperature then exceeds 225° F. and remains above 220° F. for twenty-five seconds. Based upon these operating parameters readings, the controller shuts down the engine. When the water temperature drops to 190° F., the controller will restart the engine. If the high engine water temperature condition re-occurs an excessive number of times within a given period, the engine can be shutdown permanently until operator intervention is undertaken to correct the problem. When operator intervention does occur, the operator can use the user interface 22 to obtain data related to the condition which caused the engine shutdown and/or the time at which the shutdown condition occurred.

In the preceding example, restart was initiated by the controller subsequent to a controller initiated engine shutdown. The automatic restart sequence can also be used when the shutdown occurs for extraneous reasons such as the engine operating temporarily in a low oxygen environment such as a tunnel or a small enclosure. In such a case, engine shutdown could be detected by the controller if engine rpm's drop below a normal operating condition, for example.

Processor 16 can be configured to restart the engine after nuisance shutdown as described above. The processor may also be configured to run a pretrip engine diagnostic and startup sequence. An operator initiates the sequence by way of the keypad 22. Once pretrip is initiated, the controller reads the non-running status of, for example, the following components: engine oil pressure, engine coolant level, engine air intake, filter switch, engine oil level, engine rpm, engine water temperature, run relay, run relay feedback, preheat relay, preheat relay feedback, start relay, excitor relay, battery volts, alternator output volts and excitor current.

It can be appreciated the appropriate sensors can be connected to the controller to measure the condition of these system components as well as other components which could be of interest. In the non-running status, engine oil pressure should be low, engine coolant level should be high and each additional component or operating parameter will have a proper or normal state. If the processor determines that component or engine operating parameter is not in the proper state, an alarm code will be generated, displayed on the user interface 22 and stored in memory 24 to aid in diagnosing engine problems.

Depending on the alarm code, the pretrip sequence may be aborted. For example, if the problem condition detected would cause serious engine damage, the startup will be aborted. If these parameters are in the proper state, the controller will continue in the non-running pretrip sequence by energizing the preheat output and then de-energize the preheat output. While preheat output is energized and de-energized both preheat feedback and battery volts will be checked for their proper state. The run relay is energized and run relay feedback checked for proper state. Then the run relay is de-energized and again the run relay checked for its proper state.

After completing the non-running pretrip, the controller will start the engine. The engine start routine can include diagnostics for failure of the engine to crank or start, engine rpm's, oil pressure, preheat feedback and run relay feedback. Once the engine is started, the running pretrip continues. Prior to energizing the alternator, the engine oil pressure, engine coolant level, engine air intake filter switch, engine oil level, engine rpm, engine water temperature, battery volts, alternator output volts, and excitor current are checked to determined whether they are in the proper state. If it is determined that these parameters in the proper state, the alternator will be energized and the engine allowed to continue to run. Finally, the display can indicate the result of all previous checks and display a "PASS" or "FAIL". A "CHECK" condition can also be displayed indicating some parameters may not be in a normal operating range, but would not affect capability of the generator set to provide output power.

Numerous characteristics and advantages of the invention covered by this document have been set forth in the foregoing description. It will be understood, however, that this disclosure is, in many respects, only illustrative. Changes may be made in details, particularly in matters of shape, size, and arrangement of parts without exceeding the scope of the invention. The inventions's scope is, of course, defined in the language in which the appended claims are expressed.

What is claimed is:

1. In a generator set comprising a prime mover which drives a generator, the prime mover having a running mode where the prime mover component parts are moving relative to each other, and a non-running mode where the prime mover component parts are stationary, the prime mover including means for starting and stopping the prime mover and means for sensing a non-running mode value of at least one prime mover operating parameter; and a controller, having a controller memory, the controller being in signal receiving and transmitting relation with the sensing means and in signal transmitting relation with the prime mover starting and stopping means to control the operation of the prime mover and the generator; a method of performing a pretrip generator set diagnosis while the prime mover is in the non-running mode to determine if the prime mover may be started, the method comprising the steps of:

a) the sensing means sensing the non-running value of at least one prime mover operating parameter;

b) transmitting the sensed non-running value of the at least one prime mover operating parameter to the controller;

c) at the controller, comparing the sensed non-running value of the prime mover operating parameter with a predetermined non-running value for the at least one prime mover operating parameter;

d) initiating prime mover running mode startup if the sensed non-running value of the prime mover operating parameter is within an acceptable range;

e) aborting the generator set pretrip routine if the sensed non-running value of the at least one prime mover operating parameter is not within an acceptable range;

f) if the generator pretrip routine is aborted in step e), recording the non-running value of the at least one engine operating parameter in controller memory;

g) after the prime mover running mode has been initiated in step d), sensing the running values of at least one prime mover operating parameter;

h) transmitting the sensed running value of the at least one prime mover operating parameter to the controller;

i) at the controller, comparing the running value of the at least one prime mover operating parameter with a predetermined acceptable running value for the prime mover operating parameter; and j) if the running value for the prime mover operating parameter is not within an acceptable range, transmitting a stop signal from the controller to the prime mover stop means stopping the prime mover and recording the running status in the controller memory.

2. The method as claimed in claim 1, wherein the controller includes means for displaying messages to an operator, the method including the additional step of displaying the results of the pretrip routine to an operator.

3. The method as claimed in claim 1 wherein the controller includes an interface for displaying messages to an operator, the method including the additional step of displaying an alarm code on the interface if the non-running value of the prime mover operating parameter is outside the acceptable operating range.

4. The method as claimed in claim 1 wherein the prime mover has an oil pressure, the non-running operating parameter sensed being prime mover oil pressure.

5. The method as claimed in claim 1 wherein the prime mover includes a volume of prime mover coolant, the non-running operating parameter sensed being prime mover coolant level.

6. The method as claimed in claim 1 wherein the prime mover includes a volume of water having a water temperature, the non-running operating parameter sensed being prime mover water temperature.

7. The method as claimed in claim 1 wherein the prime mover includes a battery, the non-running operating parameter sensed being battery volts.

8. In a generator set comprising: a prime mover connected to a generator, the prime mover including prime mover shutting down and starting means and sensing means for sensing the non-running value of at least one prime mover operating parameter, the prime mover having a running mode and a non-running mode; the generator set further comprising controller means for controlling the operation of the prime mover and generator, the controller means having a controller memory unit and a controller interface, the controller means being in signal receiving relation with the sensing means and being in signal transmitting relation with the prime mover shutting down and starting means; a method for running a generator set pretrip diagnostic routine while the prime mover is in the non-running mode to determine whether it is acceptable to start the prime mover; the method comprising the steps of:

a) sensing the non-running value of at least one prime mover operating parameter;

b) transmitting the sensed non-running value of the at least one prime mover operating parameter to the controller;

c) comparing the sensed non-running value of the at least one prime mover operating parameter with a predetermined acceptable non-running value for the operating parameter, if the non-running value is within an acceptable range initiating the prime mover running mode, and if the non-running value of the prime mover operating parameter is not within an acceptable range aborting the generator set diagnostic pretrip routine.

9. The method as claimed in claim 8, wherein initiating the prime mover running mode is comprised of the step of transmitting a start signal from the controller to the shutting down starting means.

10. The method as claimed in claim 8, wherein when the diagnostic routine is aborted in step c) an alarm code is displayed on the controller interface and an error code is stored in controller memory.

11. The method as claimed in claim 8 wherein the prime mover has an oil pressure, the non-running operating parameter sensed being prime mover oil pressure.

12. The method as claimed in claim 8 wherein the prime mover includes a volume of prime mover coolant, the non-running operating parameter sensed being prime mover coolant level.

13. The method as claimed in claim 8 wherein the prime mover includes a volume of water having a water temperature, the non-running operating parameter sensed being prime mover water temperature.

14. The method as claimed in claim 8 wherein the prime mover includes a battery, the non-running operating parameter sensed being battery volts.

15. The method as claimed in claim 8 comprising the additional step of saving the results of the pretrip diagnostic routine to the controller memory as PASS, FAIL or CHECK.

* * * * *